US006798868B1

(12) United States Patent
Montgomery et al.

(10) Patent No.: US 6,798,868 B1
(45) Date of Patent: Sep. 28, 2004

(54) CALL NOTIFICATION SERVICE FOR USE WITH CALL WAITING

(75) Inventors: Robert H. Montgomery, Oak Hill, VA (US); Barry P. Pershan, Olney, MD (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/184,008

(22) Filed: Nov. 2, 1998

(51) Int. Cl.[7] .................................................. H04M 1/64
(52) U.S. Cl. ............................ 379/88.21; 379/142.08; 379/215.01; 379/221.09
(58) Field of Search ........................... 379/93.25, 215, 379/88, 111, 114.21, 142.01, 142.04, 142.08, 212.01, 88.19, 142.06, 215.01, 88.22, 88.21, 221.09; 340/431; 455/406, 407, 408

(56) References Cited

U.S. PATENT DOCUMENTS

| | | | |
|---|---|---|---|
| 4,661,975 A | | 4/1987 | Brecher |
| 5,007,076 A | * | 4/1991 | Blakley ........................ 379/67 |
| 5,247,571 A | | 9/1993 | Kay et al. |
| 5,263,084 A | | 11/1993 | Chaput et al. |
| 5,309,512 A | | 5/1994 | Blackmon et al. |
| RE34,735 E | | 9/1994 | Kuabe et al. |
| 5,539,810 A | * | 7/1996 | Kennedy, III et al. ...... 340/431 |
| 5,572,583 A | | 11/1996 | Wheeler, Jr. et al. |
| 5,586,177 A | | 12/1996 | Farris et al. |
| 5,636,269 A | | 6/1997 | Eisdorfer |
| 5,724,481 A | * | 3/1998 | Garberg et al. .......... 379/88.01 |
| 5,848,142 A | * | 12/1998 | Yaker ........................ 379/67.1 |
| 5,852,657 A | * | 12/1998 | Malik et al. ............ 379/142.01 |
| 5,875,232 A | * | 2/1999 | Wolf ........................ 379/88.19 |
| 5,999,613 A | * | 12/1999 | Nabkel et al. .......... 379/142.04 |
| 6,044,259 A | * | 3/2000 | Hentila et al. .............. 455/406 |
| 6,219,414 B1 | * | 4/2001 | Maciejewski et al. . 379/212.01 |
| 6,233,325 B1 | * | 5/2001 | Frech et al. ................. 379/111 |
| 6,266,400 B1 | * | 7/2001 | Castagna .................. 379/88.25 |

OTHER PUBLICATIONS

"LSSGR; LATA Switching Requirements; CLASS Feature: Call Waiting Deluxe", Bell Communications Research, FSD 01–02–1215, Technical Reference TR–NWT–00416, Issue 2, Aug. 1993.

* cited by examiner

Primary Examiner—Fan Tsang
Assistant Examiner—Gerald Gauthier
(74) Attorney, Agent, or Firm—Leonard C. Suchtya, Esq.; Joel Wal, Esq.; Rader, Fishman & Grauer (57) ABSTRACT

Using intelligent network processing, call notification allows a subscriber to determine the name and telephone number of one or more numbers of recent parties to call the subscriber. An incoming call to the subscriber's number activates a terminating attempt type trigger in the central office serving the subscriber. The trigger causes communication between that office and a service control point (SCP). Under instructions from the SCP, the central office indicates a disposition event regarding the call, e.g., whether the line was busy or there was no answer. If the subscriber's line is busy or does not answer, the SCP records at least the telephone number of the caller and the time and date of the call. Later, the subscriber dials a feature code, and the SCP instructs the central office to route the call to an intelligent peripheral (IP). The SCP polls a line identification database (LIDB) to obtain name information associated with the caller's number and supplies the number, name, date and time to the IP. The IP plays an announcement of the call information and offers the subscriber the option to place a call back to the number of the original caller and/or to initiate a call to voice mail.

36 Claims, 4 Drawing Sheets

CALL NOTIFICATION SERVICE FOR USE WITH CALL WAITING

TECHNICAL FIELD

The present invention relates to an enhanced service feature provided through an intelligent telephone network, whereby a subscriber can obtain notice and information from the network regarding the identity of callers who called during times when the subscriber's communication link was busy, and possibly when there was no answer. The notification service also enables automatic follow-up calls, for example, to a caller or to a messaging service.

Acronyms

The written description uses a large number of acronyms to refer to various services, messages and system components. Although generally known, use of several of these acronyms is not strictly standardized in the art. For purposes of this discussion, acronyms therefore will be defined as follows:

Advanced Intelligent Network (AIN)
Analog Display Services Interface (ADSI)
Automatic Number Identification (ANI)
Call Processing Record (CPR)
Central Office (CO)
Common Channel Interoffice Signaling (CCIS)
Customer Premises Equipment (CPE)
Data Reporting System (DRS)
Feature Code Trigger (FCT)
Generic Data Interface (GDI)
Integrated Service Control Point (ISCP)
Integrated Services Digital Network (ISDN)
Intelligent Peripheral (IP)
Intelligent Signaling Transfer Point (ISTP)
ISDN Users Part (ISDN-UP)
Line Identification DataBase (LIDB)
Multi-Line Hunt Group (MLHG)
Multi-Services Application Platform (MSAP)
Office Equipment (OE) number
Operations Systems Network (OSN)
Plain Old Telephone Service (POTS)
Point In Call (PIC)
Primary Rate Interface (PRI)
Public Switched Telephone Network (PSTN)
Regional Bell Operating Companies (RBOCs)
Service Control Point (SCP)
Service Creation Environment (SCE)
Service Management System (SMS)
Service Switching Point (SSP)
Signaling Point (SP)
Signaling System 7 (SS7)
Signaling Transfer Point (STP)
Simplified Message Desk Interface (SMDI)
Telephone Application Program Interface (TAPI)
Terminating Attempt Trigger (TAT)
Transmission Control Protocol/Internet Protocol (TCP/IP)
Transaction Capabilities Application Part (TCAP)
Trunk (TR)
Voice Mail System (VMS)
Voice Response Unit (VRU)

BACKGROUND ART

Telephone communication has become a virtually ubiquitous aspect of modern life. Subscribers have come to depend on the telephone network to provide fast, dependable communication wherever and whenever needed. As consumers become dependent on the ease of communication and familiar with advanced services, the demand for new and still further enhanced services has increased in an almost exponential manner.

One popular telephone service offered through program controlled switches of the telephone network is commonly known as 'call waiting'. With this service, when the switch serving a subscriber detects a call to the subscriber's number when the subscriber's line is in use or 'busy', the switch applies a 'call-waiting' signal to the subscriber's line. Typically, the call-waiting signal is an audible tone, which a party using a telephone on the subscriber's line can hear through the telephone earpiece.

The call-waiting service offers the subscriber several options for responding to the call waiting signal. For example, the party using the subscriber's telephone, upon hearing the call-waiting signal, may briefly activate the telephone hook-switch to generate a 'hook-flash' signal to the central office switch. In response, the switch places the existing call on hold and connects the new call to the subscriber's line. This enables the called party to talk to the party on the second call. Subsequent hook-flash signals to the switch cause the switch to alternately connect the two caller's to the subscriber's line, to enable the subscriber to switch back and forth between the two calls, if desired.

Subscribers encounter a number of problems with existing call waiting services. Most subscribers with call waiting tend to stop an ongoing conversation and talk to a secondary caller, to determine the identity of the second caller and/or the urgency of the second call. Many subscribers, however, would prefer not to have ongoing conversations interrupted by less important calls, for example calls for solicitations. Many call waiting features commonly available today do not provide the subscriber with any information as to the identity of the caller or other information that might signify the importance of the second call. At least during particularly important calls, some subscribers ignore the call waiting tone and allow the second call to go unanswered, regardless of the identity of the caller or the importance of the second call.

In circumstances where the subscriber with call waiting elects not to answer the second call, while already engaged in an ongoing call, the new caller hears a ringback signal in the same manner as for a normal unanswered call. If the subscriber also has a network based voice mail service, the call rolls over into the subscriber's voice mailbox. This type of voice messaging service allows the caller to leave a message that may enable a call-back. If the subscriber does not have voice mail, however, the second call goes completely unanswered. The caller may assume erroneously that the subscriber is not home and therefore not call again for some period of time. Also, the called subscriber does not know who called during the in-progress call and triggered the call-waiting tone, and the subscriber may not be able to call that party back.

A number of solutions to these problems have been proposed. Several examples are outlined below.

U.S. Pat. No. 5,636,269 to Eisdorfer discloses a methodology for using information about a calling party's identity or the importance of a call to control the call waiting signal played to a called party that is busy on another call. The network routes the secondary incoming call to an intelligent processor, which interacts with the caller to obtain identity related information or an indication of the caller's perception of the importance of the call. The call waiting process and signaling to the subscriber is then controlled in accord with the identity or importance signified by the caller. For example, in one embodiment, the network provides a distinctive call-waiting signal over the subscriber's line, based on information about the identity of the calling party. In another embodiment, information about the calling party's identity controls whether a call waiting signal is played to the called party or suppressed. This type of approach does provide added information to the called subscriber, but the subscriber still must choose whether or not to interrupt an ongoing call in light of the information provided through the distinctive call waiting signaling. In some cases, the signal may fully identify the secondary caller, but in some it may not. Also, if the call-waiting signal is suppressed, the subscriber does not know that a call-waiting event occurred and may not know to return the call. There is no easy way to ensure call-back. As such, there is no easy way to ensure communication with the second caller except to interrupt the stable call and answer the waiting call.

U.S. Pat. No. 5,309,512 to Blackmon et al. discloses a deluxe call waiting service, where a switching system forwards calls for busy called stations to a service node that provides specialized call processing, e.g., text-to-speech conversion. The service node uses the dialed directory number to invoke a call waiting-originating feature, which takes precedence over the call forwarding-busy line feature. This causes transmission of a call waiting signal to the called station. The service node obtains the calling party name from a database and responds to a flash signal from the called station by speaking the calling party name to the called party. This service does provide an identification of the caller during a call-waiting event, however, the subscriber must still interrupt an existing conversation to obtain the second caller's identity and/or to take the second call.

U.S. Reissue Pat. RE34,735 to Kuabe T et al. discloses a call waiting arrangement, which prompts the caller with an announcement and offers the caller the option to request interruption of that party's existing, stable call. If the second caller remains on the line, signifying the caller's belief that his call is sufficiently important, the system will provide a signal to the called party. That called party may choose to interrupt the ongoing conversation to take the call from the new caller. Here, the control over the call-waiting signal is with the second caller. The called party presumably will impute a high importance to the second call when hearing the call waiting tone and typically will interrupt the existing call to take the secondary call. If the secondary call is not as important as the existing call, the subscriber feels that the interruption was inappropriate, and the subscriber is disappointed in the service. This approach does not enable identification of the waiting caller or later call-back, without immediate interruption of the stable call.

U.S. Pat. No. 5,263,084 to Chaput et al. discloses a call waiting feature, which provides an identification of the secondary caller to the called party engaged in an existing conversation. The local office sends a call waiting tone. The called party's terminal mutes the associated handset, and then the local office transmits the identification data relating to the secondary caller. The called party's terminal receives and displays the caller identification. The called party may elect to either accept or reject the waiting call, in the conventional manner, based on the displayed information. This methodology requires specialized equipment at the subscriber's premises to receive the caller identification information and still tends to force the subscriber to interrupt the existing communication. The subscriber must bear the cost of a specialized terminal device.

U.S. Pat. No. 4,661,975 to Brecher discloses a telephone switching system, which enables a call waiting subscriber to activate telephone buttons after the call-waiting signal, to select alternate dispositions of the waiting call. This provides the subscriber more options, but still does not address the problems of interrupting an existing call to determine the identify of the caller and/or importance of a waiting call.

In recent years, a number of the telephone carriers, including the Regional Bell Operating Companies (RBOCs), have deployed a switched based service feature identified as 'Call Waiting Deluxe'. If the called party has a calling identity delivery service and an appropriate terminal, the switch provides caller ID with the call waiting tone. The 'Deluxe' service enables the called party to select one of an enlarged set of call dispositions, by activating telephone keys or by activation of an intelligent display type telephone. For example, the called party may place the existing call on hold and answer the waiting call, the party may answer the waiting call and disconnect the existing call, the party may forward the waiting call, or the party may initiate a conference together with the existing and waiting calls. A more detailed description of the Call Waiting Deluxe feature is available in Bell Communication Research, "LSSGR, LATA Switching Systems Generic Requirements, CLASS Feature: Call Waiting Deluxe," FSD 01-02-1215, Technical Reference TR-NWT-000416, Issue 2, August 1993.

The Call Waiting Deluxe feature provides caller identification regarding the waiting call and an enhanced selection of dispositions. However, to avail themselves of the identification service, customers must subscribe to another service (the caller identity delivery service). Also, the call waiting customer must have a special terminal to display the caller ID, either a caller ID terminal or an intelligent display telephone. This added service incurs added monthly charges for the subscription, and the subscriber must purchase or rent the terminal device.

As shown by the above discussion, the various prior art efforts have not fully addressed the problems involved in call waiting, relating to enabling the subscriber to elect not to interrupt an existing call for a waiting secondary call and still be able to call back to the second caller.

For some years, the telephone industry also has been developing an enhanced telephone network, sometimes referred to as an Advanced Intelligent Network (AIN), for providing a wide array of new voice grade telephone service features. In an AIN type system, local and/or toll offices of the public telephone network detect one of a number of call processing events identified as AIN "triggers" and access a database for instructions. For an ordinary telephone service call, there would be no event to trigger AIN processing; and the local and toll office switches function normally and process such a call without referring to the central database. However, an office which detects a trigger suspends processing of the triggering call, compiles a call data message and forwards that message via a common channel interoffice signaling (CCIS) link to the database system, such as a Service Control Point (SCP). If needed, the SCP can instruct the central office to obtain and forward additional information. Once the SCP has sufficient information, it accesses its stored data tables to translate the received data into a call control message and returns that message to the office of the network via CCIS links. The network offices then use the call control message to complete the particular call. An AIN type network for providing an Area Wide Centrex service, for example, was disclosed and described in detail in commonly assigned U.S. Pat. No. 5,247,571 to Kay et al.

The AIN network has enabled telephone operating companies to quickly develop and deploy a variety of new service features. However, to date, the AIN has not been used to specifically address the above noted problems with call waiting service.

A need therefore still exists for a feature associated with call waiting that will allow the subscriber to easily determine the identity of the caller who triggered a call waiting signal during a pre-established call connection. Any such associated service should not require any interruption to the pre-established call connection, any additional customer premises equipment and preferably little or no additional subscription charges. The identification related feature also should facilitate call-back, particularly in a case where the called subscriber elects not to interrupt the existing call in response to the waiting call.

DISCLOSURE OF THE INVENTION

The present invention addresses the above-stated needs by using intelligent network type call processing to record identification information regarding a call for which a subscriber elects not to answer a call waiting signal, while engaged in an existing call. The network offers the subscriber a later announcement of the identification information and an option to call back the party from the unanswered call. The notification service, developed initially for call waiting to address the above needs, in fact has broader applicability. An enhanced implementation utilizes the intelligent network processing to record identification information for calls to a subscriber line when the line is busy or the call goes unanswered.

Thus, in one aspect, the present invention relates to a telecommunication network, programmed to detect a call to a subscriber's number and process the detected call with respect to a communication link for the subscriber. If during the processing of the call a predetermined status is detected, the network records identification information relating to the detected call. In response to a later request from the subscriber's link, the network presents an identification derived from the recorded information over the subscriber's link.

In the typical implementation, the network will attempt to complete an incoming call to the link serving the subscriber. The network will detect the result of the call, e.g. answered, busy or no-answer, and then the network records information regarding the incoming call. In a call waiting related situation, for example, the network detects that the subscriber's telephone line is busy and then records at least the number of the caller. The recorded information may include the date and time of day of the call. A party at the subscriber's station later makes a notification request, for example, by dialing a special feature code; and the network provides an announcement of the caller's telephone number and preferably the name of a party associated with the caller's telephone number.

The preferred embodiments utilize an intelligent network to implement the call processing methodology of the invention. Thus, another aspect of the invention relates to a network including central offices interconnected by trunk circuits, for processing calls originated over a plurality of communication links served through the central offices. An interoffice signaling network interconnects the central offices for communication of call related signaling messages. A service control point, remote from the central offices communicates signaling information with the offices via the interoffice signaling network. The service control point has a database of call processing records, for controlling at least some services provided through the central offices. The intelligent network also includes a message platform connected to one of the central offices. This platform receives subscriber inputs and presents information to a subscriber. The message platform also receives information from the service control point.

In operation of this intelligent network, one of the central offices detects a call to a subscriber's number. That office reports the detected call via the interoffice signaling network to the service control point. The service control point sends a predetermined event instruction to the one central office via the interoffice signaling network. During subsequent processing of the detected call, if a condition with respect to the subscriber's link corresponds to the predetermined event, the one central office sends notice to the service control point via the interoffice signaling network. In response to the notice, the service control point records information relating to the detected call in association with a call processing record of the subscriber. In response to a later request from the subscriber's link, the service control point provides the recorded information to the message platform, and the message platform provides a message containing an identification derived from the recorded information over the subscriber's link.

Other aspects of the invention relate to call processing methods, per se. For example, one aspect of the invention specifically addresses the need for notification in relation to call waiting. The method of providing call waiting notification includes detecting a call to a subscriber's number at an office of a telephone network, where the office provides service over a telephone link for the subscriber. If the subscriber's telephone link is busy, information relating to the detected call is recorded in a control point of the telephone network. The network sends a call waiting signal over the subscriber's telephone link. The telephone number and/or name of the caller may appear on a display, such as on a caller ID terminal or a PC. A party using the subscriber's link may later request notice, and in response, the network establishes a call connection of the subscriber's telephone link to a message platform. A message, including an identification derived from the recorded information, is transmitted to the requesting party through the call connection and the subscriber's telephone link.

The call processing method also preferably offers one or more calling options to the subscriber. For example, after receiving the identification message, the party may request a call-back to the party identified in the message. Alternatively, the requesting party may opt for a call to the subscriber's voice mail. In either case, the network receives the request and automatically initiates the appropriate call, from the subscriber's telephone link.

Preferably, the network provides a voice based user interface for the notification service. In such an implementation, the message platform provides spoken announcements of the notification information. The message platform may accept dialed user inputs, but preferably the platform recognizes speech signals as selections and command inputs.

In the call waiting situation, the notification service enables the called party to opt not to answer the waiting call. The existing call need not be interrupted. The called party can request and obtain notice of the caller's identity upon completion of the existing call. If desired, the called party can select an immediate call-back to the identified caller.

The subscriber or other party using the subscriber's line can obtain identification of callers, preferably including telephone number, name information, date, and time of day, without the need for special terminal equipment to receive caller ID signals.

In an expanded service, the subscriber can obtain notice and identification of all callers for calls when the subscriber's line was busy or there was no answer. The subscriber can obtain identification of callers and initiate calls back to the callers, without subscribing to a voice mail service or buying an answering machine, and the service eliminates the need to listen to messages from the callers.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

DETAILED DESCRIPTION OF PREFERRED EMBODIMENTS

Figure 1:
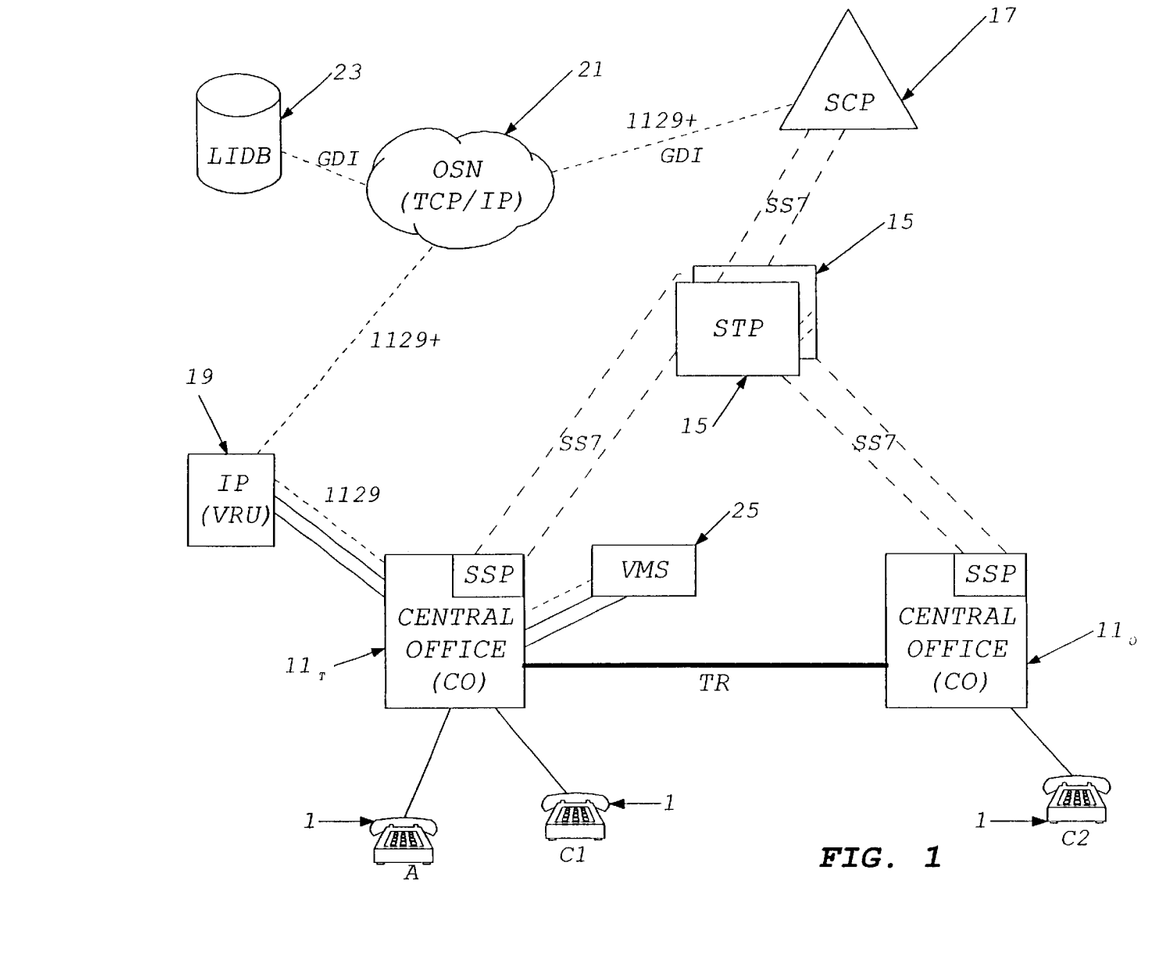
FIG. 1 is a high level functional block diagram of an intelligent telephone network, capable of providing the inventive call notification service.

The overall system illustrated in FIG. 1 includes a telephone type communication network or traffic network. The system includes a private data network used for signaling, typically for call set-up messages. The overall system may include at least one other private data network, for example to connect management systems to the control and switching nodes of the traffic network. This second data network also enables communication between databases, control nodes and special adjunct call processors.

The traffic switches of the communication network provide normal call connections between links to terminal equipment, such as telephones and the like. The traffic switches, through program control or through control by a service control point or the like, provide a variety of enhanced communications features. Of particular note, one such feature is call waiting. With this feature, if a subscriber is engaged in one call, the serving switch applies a 'call waiting' tone or other signal to the subscriber's communication link, indicating receipt of a second call intended for that link. The subscriber can take steps to communicate with the second caller, or the subscriber can ignore the second call and continue uninterrupted communication on the first call.

The subscriber premises equipment may include a variety of devices in addition or in place of a normal telephone set. The subscriber may have an answering machine or a facsimile machine that may answer calls under some circumstances. The subscriber may also have devices to enhance telephone services. For example, if the subscriber subscribes to normal caller ID, the subscriber normally has a caller ID terminal coupled to the line, to display at least the number and possibly the name of the calling party. For a number of enhanced services, the subscriber may rent or purchase an advanced terminal, such as one implemented in accord with the analog display services interface (ADSI). Alternatively, a subscriber's computer may implement a telephone application program interface (TAPI), to allow the customer to utilize PC applications to provide user interfaces for enhanced services.

Some of the advanced customer premises terminal devices, such as ADSI compliant screen display telephones and PCs implementing a TAPI program, may be able to display the caller ID upon receipt of a call waiting indication. However, typically, terminals with such enhanced displays and user interfaces are convenient for use only from one or two telephones on the premises. The subscriber may have several more telephones at other locations throughout the premises, which lack the capability to display caller ID information. Also, many customers will prefer only the network services and will opt to avoid the costs of terminal equipment that may soon be outdated by new technologies.

The present invention provides a network based solution. The subscriber need not rely on displayed caller ID information, when deciding to interrupt an existing call to take a waiting call. The subscriber can determine the number and preferably the name of parties who called while the line was busy and/or were not answered at the subscriber premises, without the use of an answering machine or the like. In accord with the invention, the control point of the network records information about the second call or the unanswered call for later presentation to the subscriber.

As discussed in detail later, the recording of information about the call and subsequent presentation to the subscriber may apply to busy and unanswered calls and possibly even to all calls to the subscriber's telephone number. To understand the various embodiments of the invention, it may be helpful first to consider the structure and general operation of an intelligent telephone network as an example of a system capable of implementing the notification service of the present invention.

FIG. 1 provides a high level illustration of an intelligent implementation of a Public Switched Telephone Network (PSTN), used to provide call waiting and the various call notification services of the invention. In the example depicted in FIG. 1, the telephone network is an advanced intelligent network or 'AIN'. As shown, the telephone network includes a switched traffic network and a common channel signaling network carrying the control signaling messages for the switched telephone traffic network. The telephone or traffic network, operated by one carrier or a combination of local carriers and interexchange carriers, includes a number of nodes, typically end office and tandem office type central office (CO) switching systems 11 interconnected by trunk circuits TR, only one of which is shown.

FIG. 1 shows a number of subscriber stations, depicted as telephones 1, connected to a series of central office switches 11. In the preferred implementation, the connections to the central office switches 11 utilize telephone lines (e.g. POTS or ISDN), and the switches 11 are telephone type switches for providing landline communication. However, it should be recognized that other communication links and other types of switches could be used. For example, some or all of the connections between the stations 1 and the central offices 11 may include digital or analog radio inks, and the central offices may include mobile telephone switching offices.

Trunk circuits TR carry communication traffic between the central office switches 11.

Each end office type central office switch 11 provides switched telephone connections to and from local communication lines or other subscriber links coupled to end users customer premises equipment (CPE) devices, shown as stations or telephone sets 1. The typical telephone network also includes one or more tandem switching offices (not shown), which provide trunk-to-trunk connections between end offices and/or between other tandem offices. Some offices may serve as both end offices and tandem offices for providing different call connections. As such, the traffic network consists of local communication links and a series of switching office type nodes interconnected by voice grade trunks TR. This traffic network enables selective call connections between various subscriber's links as well as between subscriber links and links to various specialized platforms, such as voice mail systems. As discussed more later, another example of such a connection is to a message platform for providing messages relating to the notification service.

Although shown as telephones in FIG. 1, the terminal devices or stations 1 can comprise any communication device compatible with the local communication link. Where the link is a standard industry recognized voice grade telephone line, for example, the terminals could include facsimile devices, modems etc.

Certain special service features are provided by program controlled switches serving as the COs 11. Examples include call forwarding, call transfer and conference calling. Another switch-based special service feature is call waiting.

The lines and trunks through the central offices 11 carry the communication traffic of the telephone network, including voice traffic, facsimile traffic, modem-to-modem traffic, ISDN traffic, Internet access traffic and the like. The preferred telephone network also includes a common channel interoffice signaling (CCIS) network carrying a variety of signaling messages, principally relating to control of processing of various calls through the traffic portion of the network. The CCIS network includes packet data links (shown as dashed lines) connected to appropriately equipped central office switching systems 11 and a plurality of packet switches, termed Signaling Transfer Points (STPs) 15. To provide redundancy and thus a high degree of reliability, the STPs 15 typically are implemented as mated pairs of STPs. The STPs of each pair are interconnected with each other and with other pairs of STPs on the CCIS network. The CCIS network of the telephone system operates in accord with an accepted signaling protocol standard, preferably Signaling System 7 (SS7).

In the preferred embodiment shown in FIG. 1, each central office 11 has at least minimal SS7 signaling capability, which is conventionally referred to as a signaling point (SP) in reference to the SS7 network. As such, the offices can exchange messages relating to call set-up and tear-down, typically in ISDN users part format (ISDN-UP) of the SS7 protocol.

At least some, and preferably all, of the central office switches 11 are programmed to recognize identified events or points in call (PICS) as advanced intelligent network (AIN) type service triggers. In response to a PIC or trigger, a central office 11 initiates a query through the CCIS signaling network to a control node, such as a Service Control Point (SCP) 17, or to a database system. An SCP 17 provides instructions relating to AIN type services in response to such queries. The signaling message communications between the central office switching systems 11 and the SCP 17 utilize messages conforming to the Transaction Capabilities Application Part (TCAP) of the SS7 protocol. Those central office switching systems having full AIN trigger and TCAP query and response processing capabilities, for communication with the SCP, are referred to as Service Switching Points (SSPs).

A typical telephone network serving a large number of customers over a wide geographic area utilizes a number of SCPs 17, only one of which appears in FIG. 1, for convenience. Each SCP 17 connects through SS7 links to one pair of the STPs 15. For most AIN services, a central office 11 obtains the requisite call control information from one SCP 17 serving the area in which the switch resides. However, some services do require signaling communication to more than one of the SCPs 17 to complete processing of a given call, and a variety of techniques for mediating these communications between the local and remote SCPs are known.

The central office switches 11 typically consist of programmable digital switches with CCIS communications capabilities. One example of such a switch is a 5ESS type switch manufactured by Lucent Technologies (formerly part of AT&T); but other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers, launch appropriate queries and control further call processing based on response messages.

The above described data signaling network between the SSP type central offices 11 and an SCP 17 is preferred, but other signaling networks could be used. For example, instead of the packet switched type links through one or more STP's, a number of central office switches 11, one of the SCPs 17 as well as other signaling nodes in a region could be linked for data communication by a token ring network. Also, the SSP capability may not always be available at the local office level, and several other implementations might be used to provide the requisite SSP capability. For example, none of the end office switches may have SSP functionality. Instead, each end office would connect through a trunk to a tandem office which has the SSP capability. The SSP tandem then communicates with the SCP via an SS7 type CCIS link, as in the implementation described above. The SSP capable tandem switches are digital switches, such as the 5ESS switch from Lucent Technologies; and the non-SSP type end offices might be 1A analog type switches.

The SCP 17 may be general purpose computer storing a database of call processing information. In the preferred implementation, the SCP 17 actually is an element of an Integrated Service Control Point (ISCP) developed by Bell Atlantic and Bell Communications Research (Bellcore). The ISCP is an integrated system. Among other system components, the ISCP includes a Service Management System (SMS), a Data and Reporting System (DRS) and the actual database also referred to as the Service Control Point (SCP). In this implementation, the SCP maintains a Multi-Services Application Platform (MSAP) database which contains call processing records (CPRs) for processing of calls to and from various subscribers. The ISCP also typically includes a terminal subsystem referred to as a Service Creation Environment or SCE for programming the MSAP database in the SCP for the services subscribed to by each individual customer.

The components of the ISCP are connected by an internal, high-speed data network, such as a token ring network. The internal data network also typically connects to a number of interfaces for communication with external data systems, e.g. for provisioning and maintenance. In the preferred embodiment, one of these interfaces provides communications to and from the SCP 17 via a packet switched data network, such as the TCP/IP based CSN network 21. As discussed more below, this interface enables SCP 17 to communicate data regarding the notification service, with the notification service message platform, and/or with another database system.

The SCP may be implemented in a variety of other ways. The SCP 17 may be a general purpose computer running a database application and may be associated with one of the switches. Some vendors refer to their control database systems as network control points or as action control points. Another alternative is to implement a database of CPRs or the like within an STP (see e.g.

Farris et al. U.S. Pat. No. 5,586,177).

The preferred telephone network also includes one or more intelligent peripherals (IPs) 19. For the notification service, one of the IPs serves as the message platform, to provide various messages in a form presentable to parties using the telephone network. The IP may provide data or facsimile type messages, including messages containing the identification information associated with the inventive notification service. In the preferred embodiments, the IP 19 serves as an announcement platform, to provide enhanced audible announcement and caller input collection capabilities. The IP 19 may collect dialed digits. However, in the preferred embodiments, the IP 19 also performs voice or speech recognition, to detect spoken selections and/or commands relating to the notification service. The preferred IP 19 is essentially similar to that disclosed in commonly assigned U.S. Pat. No. 5,572,583 to Wheeler, Jr. et al. entitled "Advanced Intelligent Network with Intelligent Peripherals Interfaced to the Integrated Services Control Point, " and the disclosure of the network and operation of the IP from that Patent is incorporated herein in its entirety by reference.

Each IP 19 may connect to one or more of the central offices 11. The connections transport communication traffic for a plurality of parallel calls as well as related signaling. The connection between a central office 11 and the IP 19 may use a combination of a T1 and a Simplified Message Desk Interface (SMDI) link, but preferably this connection utilizes a primary rate interface (PRI) type ISDN link. Each such connection between a CO 11 and an IP 19 provides digital transport for a number of two-way voice grade type telephone communications and a channel transporting signaling data messages in both directions between the CO switch 11 and the IP 19.

There are certain circumstances in which the SCP 17 communicates with the IP 19. Some aspects of these communications utilize a message set as specified in Bellcore's GR-CORE 1129 protocol and go through an SSP type central office 11 and the SS7 network. For some of the communications, the IP 19 and the SCP 17 communicate with each other via a separate second signaling network, for example a TCP/IP network such as the Operations Systems Network (OSN) 21 shown in the drawing. The communications through network 21 between the IP 19 and the SCP 17 may utilize an 1129+ protocol or a generic data interface (GDI) protocol, as discussed in the above incorporated Patent to Wheeler, Jr. et al.

The IP 23 can provide a wide range of call processing functions, such as message playback and digit collection. In the preferred system, the IP also performs speech recognition with associated announcement generation and/or message playback, so as to function as a voice response unit (VRU) . The IP 19 used for the notification service may also offer a network type voice mail service, in which case the IP 19 also includes storage for subscriber specific greetings and messages received for subscribers' mailboxes.

The OSN network 21 also facilitates communications with other database systems, for example, to obtain identification information. The information may reside in a third party of customer owned database, but preferably it resides in a carrier operated database, such as the Line Identification DataBase (LIDB) 23. The LIDB 21 provides subscriber account related information, for calling card billing services or for subscriber name display purposes in an enhanced caller ID application. The LIDB database 23 is a general purpose computer system having a signaling link interface or connection. In the illustrated example, the LIDB 23 has an interface to the OSN network 21, to enable data communications with the SCP 17. If the LIDB provides credit card verification and/or name information to the switches in COs 11, the computer system implementing the LIDB 23 also has a signaling link interface or connection (not shown) to a pair of STPs 15, to enable SS7 communications with the central offices 11.

The computer system implementing the LIDB 23 runs a database program to maintain a database of information relating to customer accounts and identifications. The LIDB database includes a single listing for each telephone line. For example, a subscriber's entry in the LIDB database might include the subscriber's telephone number, a personal identification number for credit card billing purposes, and the subscriber's name and address. For identification services, the listing in the LIDB database 23 enables translation of a telephone number into a single name, typically the name of the party identified as the customer or subscriber for billing purposes.

For purposes of the notification service, the LIDB 23 communicates with the SCP 17 via the OSN data network 21, using the Generic Data Interface (GDI) protocol. The GDI message set is simple and generic, and the messages can carry almost any desired amount of data.

As discussed in more detail later, the SCP 17 will transmit a 'get-data' message in the GDI protocol over the OSN network 21 to the LIDB database 23, to request a translation of one or more telephone numbers into one or more associated names. The LIDB 23 performs the translation and returns a GDI message with the name information through the OSN network 21 to the ISCP.

Some subscribers to the service features of the invention may also subscribe to voice mailbox type services provided by the voice mail system (VMS) 25. The VMS system may be customer owned or third party owned, or the VMS may be an element of the network. A VMS type system is a specialized computer system that digitizes, compresses and stores audio and other messages in digital form on one or more disk drives. In a public network implementation, a VMS 25 connects to a CO 11 via a multi-channel circuit and a signaling channel. In the CO 11, the profile data associated with the multi-channel circuit designates that circuit as a multi-line hunt group (MLHG) , for sending and receiving a set number of predetermined parallel calls over the channels. The CO 11 and the VMS 25 utilize the signaling channel to control call set-up and related operations. These connections between a central office 11 and the VMS 25 may use a combination of a T1 and a Simplified Message Desk Interface (SMDI) link, or these connections may utilize a primary rate interface (PRI) type ISDN link.

A comprehensive review of exemplary voice mail systems and voice messaging systems is disclosed in U.S. Pat. No. 5,631,948 to Bartholomew et al., the disclosure of which is incorporated in its entirety herein by reference.

On a normal call, an end office type switch 11 will detect an off-hook condition on the line and provide dial tone. The switch identifies the line by its Office Equipment (OE) number. The office also retrieves profile information corresponding to the OE number and off-hook line. If needed, the profile identifies the currently assigned telephone number. The switch in the end office receives dialed digits and routes the call. The switch may route the call to another line serviced by that switch, or the switch may route the call over trunks and possibly through one or more tandem offices to an office that serves the called station or line. The terminating line may go to another subscriber or to some platform, such as an IP 19 or a voice mail system (VMS) 25. The switch terminating a call to a destination will also utilize profile information relating to the destination, for example to forward the call if appropriate, to apply distinctive ringing, etc. Either or both profiles may indicate that the respective party subscribes to a call waiting service and provide any information needed to facilitate operation of that service.

To facilitate the services of the present invention, if one of the terminal stations on a call correspond to a service subscriber, the profile for the link to that station will indicate that the customer subscribes to call waiting service. The profile also will establish the PIC or trigger condition necessary for the notification service, preferably a terminating attempt trigger (TAT).

AIN call processing involves a query and response procedure between an SSP capable switching office 11 and a database system, such as an SCP 17. The SSP capable switching offices initiate such processing upon detection of triggering events. At some point during processing of a telephone call, a central office switching system 11 will recognize an event in call processing as a 'Point in Call' (PIC) which triggers a query, for example to the SCP 17. Ultimately, the SCP 17 will return an instruction to the switching system 11 to continue call processing. This type of AIN call processing can utilize 10 a variety of different types of triggers to cause the SSPs 11 to initiate the query and response signaling procedures with the SCP 17. The notification service utilizes two triggers, the terminating attempt trigger (TAT) and a feature code trigger (FCT)

In a network such as shown in FIG. 1, routing typically is based on dialed digit information, profile information regarding the link or station used by the calling party and profile information regarding a line or station in some way associated with the dialed digits. Any given subscriber's telephone services therefore may be controlled by data residing in one or more of the central office switching systems 11, in one or more of the SCPs 17 or in one or more of the IPs 19. For some services requiring processing by an IP 19, the IP also may store or receive subscriber specific control information, for use in providing the subscriber or a party calling the subscriber with the desired service.

Call waiting service normally is controlled by the profile information stored in the end-office switch 11 serving the line to the subscriber's premises. However, in accord with the invention, calls to the subscriber's telephone number trigger processing involving the SCP 17, to enable the SCP to selectively record the callers' numbers. The SCP 17 will instruct the end-office switch 11 to activate call waiting, in appropriate circumstances. The recording of the caller's number enables translation, e.g. by accessing the LIDB 23, to obtain associated name information. When the subscriber seeks to obtain actual notice, the SCP 17 transfers the name and number information to the IP 19. The IP provides a user interface based on spoken messages and voice or dialed inputs from the subscriber, to enable the subscriber to listen to announcements of the information regarding the incoming calls. The network also offers the subscriber subsequent calling options, such as a direct call back to the number of a selected one of the callers or a call to the subscriber's voice mail service.

To understand the operation of the network to provide the notification service, it may be helpful to consider a specific example. For purposes of discussion assume that a person at the subscriber's station A is communicating with a first caller at station C1. A call connection exists between those two stations through central office $11_T$. The call between A and C1 is stable. Now a second caller at station C2, connected through a line to central office $11_O$, attempts to call the subscriber A through office $11_T$.

Figure 2:
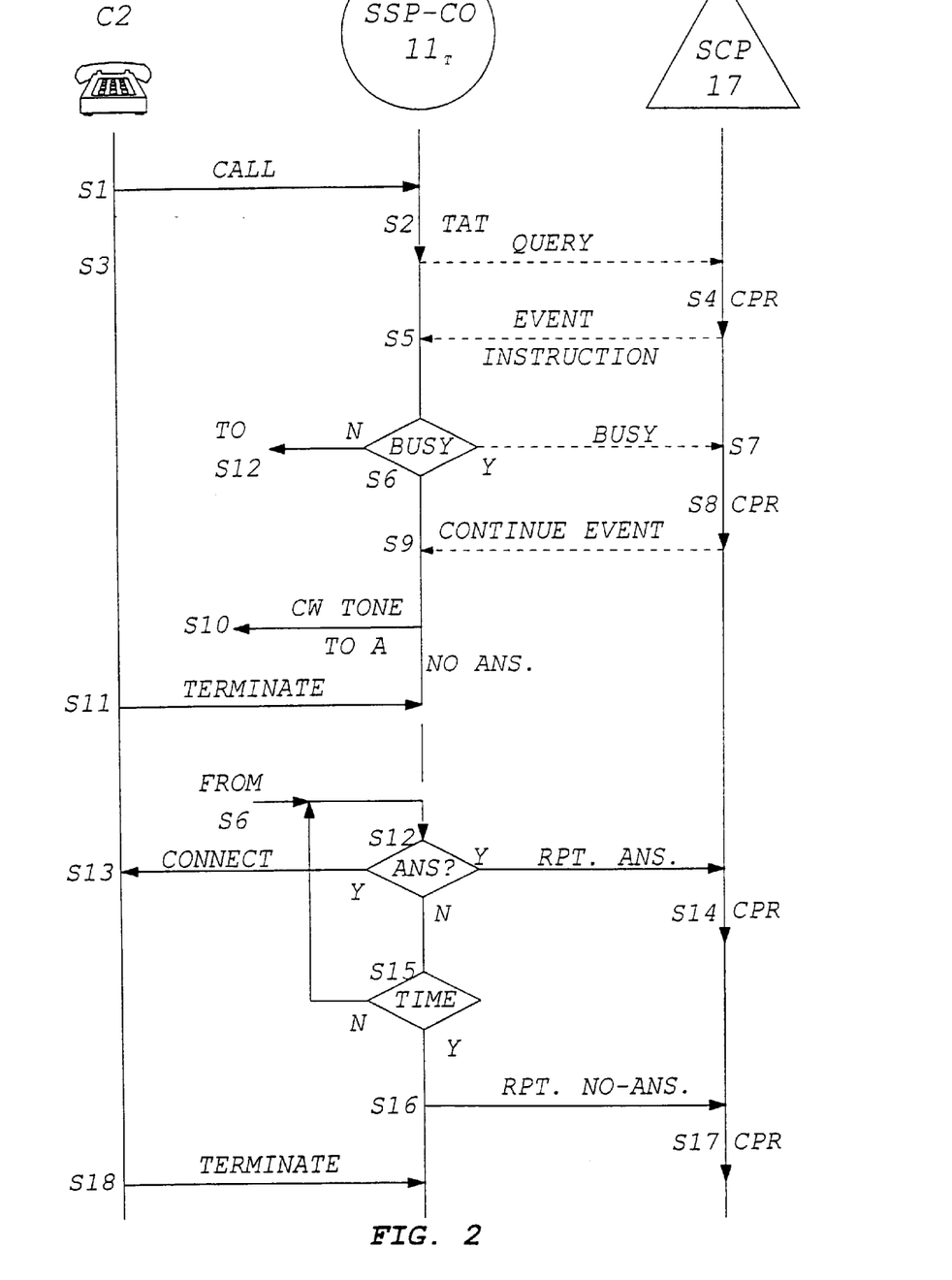
FIG. 2 is a signaling flow diagram illustrating the signaling communication and process flow for a call to a subscriber having call waiting and call notification service.

FIG. 2 is a signal flow diagram, helpful in understanding the processing of a call to a subscriber. In an initial example, assume the call occurs at a time when the subscriber's line to station A is in-use on an existing call with caller C1. At such a time, the subscriber's line to station A is busy. As will become apparent from the discussion below, the invention also provides notification if the line was free but the call goes unanswered.

The process begins when a second caller at station C2 dials the subscriber's telephone number. In this example, the central office $11_O$ serves as the originating office. That office initiates standard SS7 signaling in an attempt to establish a call connection from station C2 to station A.

The network processes the call in the normal manner until the appropriate signaling reaches the end-office switch serving the called subscriber's line, in this case the office $11_T$ serving as the terminating office (step S1). In that SSP-type CO switch $11_T$, the subscriber profile associated with the dialed destination number includes information establishing a terminating attempt trigger (TAT) against that subscriber's line to station A.

When the call processing reaches the point in call (PIC) corresponding to the TAT (step S2), the central office $11_T$ suspends its processing of that second call. The SSP capable CO switch $11_T$ formulates a TCAP query and sends that query through one or more of the STPs 15 to the SCP 17 (step S3). The query includes a variety of information relating to the call, notably the dialed destination telephone number, the telephone number of the calling party and an identification of the type of triggering event, in this case a TAT.

Based on the type of trigger, the SCP 17 determines what information from the query to use as a service key. For the TAT type trigger, the SCP uses the dialed number as the service key. Using that number, the SCP 17 retrieves a call processing record (CPR) from its internal database (step S4). In this case, the CPR is one associated with the called subscriber A.

The current release of AIN software utilized by SSPs and ISCPs and the like, AIN release 0.2, supports a functionality referred to as an 'event'. A 'response' is a final AIN message, but an 'event' is a conversational message requiring an answer after the switch implements some action. An 'event' thus is a process initiated after triggering, which the network uses to determine status. Based on the status, the control point (SCP or ISCP) can use an 'event' to initiate a particular further action. For the call notification associated with call waiting service, the subscriber's CPR causes the SCP 17 to generate an instruction for the central office $11_T$ (step S5) including a 'terminating busy event,' a 'terminating answer event,' and a 'terminating no-answer event' that utilizes a timing function. These events cause the switching system to resume normal call processing but report the next outcome of the call (busy, answer, no-answer) to the SCP 17.

In response to the event instruction, the terminating office $11_T$ attempts to complete the call from C2 to A. In this regard, the terminating central office CO $11_T$ first determines if the subscriber's line is busy (step S6). If the line is free (not busy) the processing at step S6 jumps to step S12, for further processing as discussed later. In the present example, however, we have assumed that the subscriber at station A is engaged in communication over an existing call connection to the first caller station C1. At step S6, because the line is busy, the terminating SSP-CO $11_T$ sends a TCAP message over the interoffice signaling network reporting the 'busy' type outcome of the call to station A.

The SCP 17 now processes the message based on the same subscriber's CPR (step S8). At this point, the SCP 17 records the telephone number of the second caller C2, the date and the time of the call in a list associated with the subscriber's CPR. The SCP 17 will accumulate up to some maximum number (e.g. ten) of callers numbers in the list and then replace the oldest with the newest number. In the preferred embodiment, the SCP maintains a list for the three most recent callers. If the same caller calls more than once, the number is not added repeatedly to the list. Instead, the SCP notes the number of calls from the particular calling party number.

AIN release 0.2 also supports a functionality referred to as a 'Continue Event'. This type of message allows the control point (SCP or ISCP) to instruct a switch to activate a particular feature for further processing of a call. For purposes of the call notification service of the present invention, the SCP 17 sends back an 'Continue Event' message regarding call waiting for the subscriber's station A. More specifically, at the end of the processing of the CPR in step S8, the SCP 17 sends a 'Continue Event' message to the terminating office $11_T$ (step S9), causes that office to activate call waiting (step S10).

The processing of the CPR in the SCP, responsive to the busy condition, could utilize event signaling to implement a variety of conditional processes. For example, the network could give call waiting tone only if the call is from a recognized telephone number, the network could prioritize the call waiting signal based on the calling party's number, etc. For discussion here, however, assume the simplest example. The terminating office $11_T$ sends a call waiting tone over the line to the subscriber's station A, in the normal manner (step S10)

At this point, the party at station A could answer the second call from C2 or select some alternate disposition for that call, using the normal functions of the switch-based call waiting service. However, assume for our example that the party at called station A simply elects not to answer the waiting call from caller C2. The caller at C2 continues to hear ringing until he or she chooses to hang-up, and the second call terminates (step S11). The SCP has recorded the number of the caller and other information regarding the call; and the subscriber can obtain notification based on that information, in the manner discussed below with regard to FIG. 3.

The waiting call may terminate when the caller C2 hangs up, or if the subscriber A has voice mail, the call may terminate upon redirection to the VMS upon detection of a no-answer condition. In either case, the party using the called station A continues the original conversation with the party at station C1, without interruption. When the conversation is complete, that call connection also terminates. However, during the intelligent processing of the call from C2, the SCP 17 recorded the caller's number for use in a later notification regarding that call.

In the above discussed example, the called subscriber's line was busy, because the station A was engaged in a call with party C1 at the time of the call from C2. The notification service of the present invention however also applies to unanswered calls, when the subscriber's line is otherwise free. Consider now a call from station C2 to station A, when the line to station A is free. In such a case, when the processing reaches step S6 in FIG. 2, the terminating office $11_T$ recognizes that the line is not busy, and processing jumps from step S6 to step S12.

At this point, the terminating central office CO $11_T$ applies a ringing signal to the line to subscriber A's station and instructs the originating office $11_O$ to supply ringback tone over the line to the calling station C2 (step not separately shown). The second caller hears ringing. At the same time, the terminating central office CO $11_T$ determines if there is an answer condition on the line to the called party's station (step S12). If there is an answer, the terminating central office CO $11_T$ sends a message to the SCP reporting that event outcome (step S13). When a party answers the telephone call at the station 1 for the called party A, the network also connects the call between stations C2 and A, in the normal manner (S13). The SCP again accesses the subscriber's CPR (step S14). In this example, where there has been an answer to the call, the SCP 17 does not record any information regarding the call for the subscriber's notification list. SCP processing typically ends here if the call is answered.

Alternatively, when the terminating central office CO $11_T$ checks in step S12 to determine if there is an answer, the called party may not have answered yet. In such a case, the processing branches to step S15. Step S15 is a timer operation used to recognize a no-answer condition. The period of the timer may allow for approximately two to four ring cycles. If the time period has not expired since the first application of the ringing signal to the line to the subscriber of station A, then processing flows back to the check for an answer condition in step S12. This process loop S12 and S15 continues until a person or processor at the station A answers the call as described above or the time period expires. If the time expires, the terminating central office CO $11_T$ detects this event in step S15, and processing branches from step S15 to step S16.

In step S16 the terminating central office CO $11_T$ sends a TCAP message over the interoffice signaling network reporting the 'No-Answer' type outcome for the call to station A. In such a no-answer situation, the SCP 17 again accesses the same subscriber's CPR (step S17). At this point, the SCP 17 records the telephone number of the second caller C2, the date and the time of the call in the list associated with the subscriber's CPR. The SCP 17 accumulates callers' number for busy and unanswered calls up to the maximum number allowed for this subscriber's notification list, after which the SCP replaces the oldest number with the newest number.

Even after the time (S15) is sufficient for the network to assume no-answer, the caller at C2 continues to hear ringing until he or she chooses to hang-up, and the call terminates (step S18). The SCP has recorded the number of the caller and other information regarding the call, exactly the same as for the call in the call waiting example.

As an alternative to termination (S11 or S18), the subscriber A may also subscribe to a voice mail service. In such a case, instead of the caller C2 hanging-up to terminate the waiting or unanswered call, the terminating central office $11_T$ typically will reroute the call to the voice mail system 25 after a predetermined number of rings, e.g. after three rings. The voice mail system 25 plays the subscriber's personalized greeting message and records any verbal message from the caller C2 in the subscriber's mailbox.

In the processing of any call in the 'call-waiting' scenario, i.e. the call from C2 to A during an existing connection to C1 in our example, the SCP 17 records the telephone number and the time for the call from C2. In the presently preferred embodiment, the SCP records this information for all calls to the subscriber when the subscriber's line is busy. The SCP 17 makes this recording regardless of whether or not the party at the subscriber's station A responds to the call waiting tone by answering the second call. The SCP also records the date, time and calling party number for all calls to the subscriber's number, which are not answered within the predefined interval (S15). The network does not record call information only if equipment at the called subscriber's location A answers the call.

Although not necessary, the network may be adapted to provide the subscriber or other party at station A with some special type of alert signal, indicating availability of the identification information through the call notification service. For example, upon completion of the stable call with C1, the SCP could instruct the IP to initiate a call to the subscriber's station A and play an announcement when someone answered that call. Another option might be to instruct the switch to apply a special ringing signal to the line to station A. Alternatively, the CO switch $11_T$ might apply an interrupted dial tone, when a person at premises A subsequently took a station handset off-hook, to check for messages or make another call.

Figure 3:
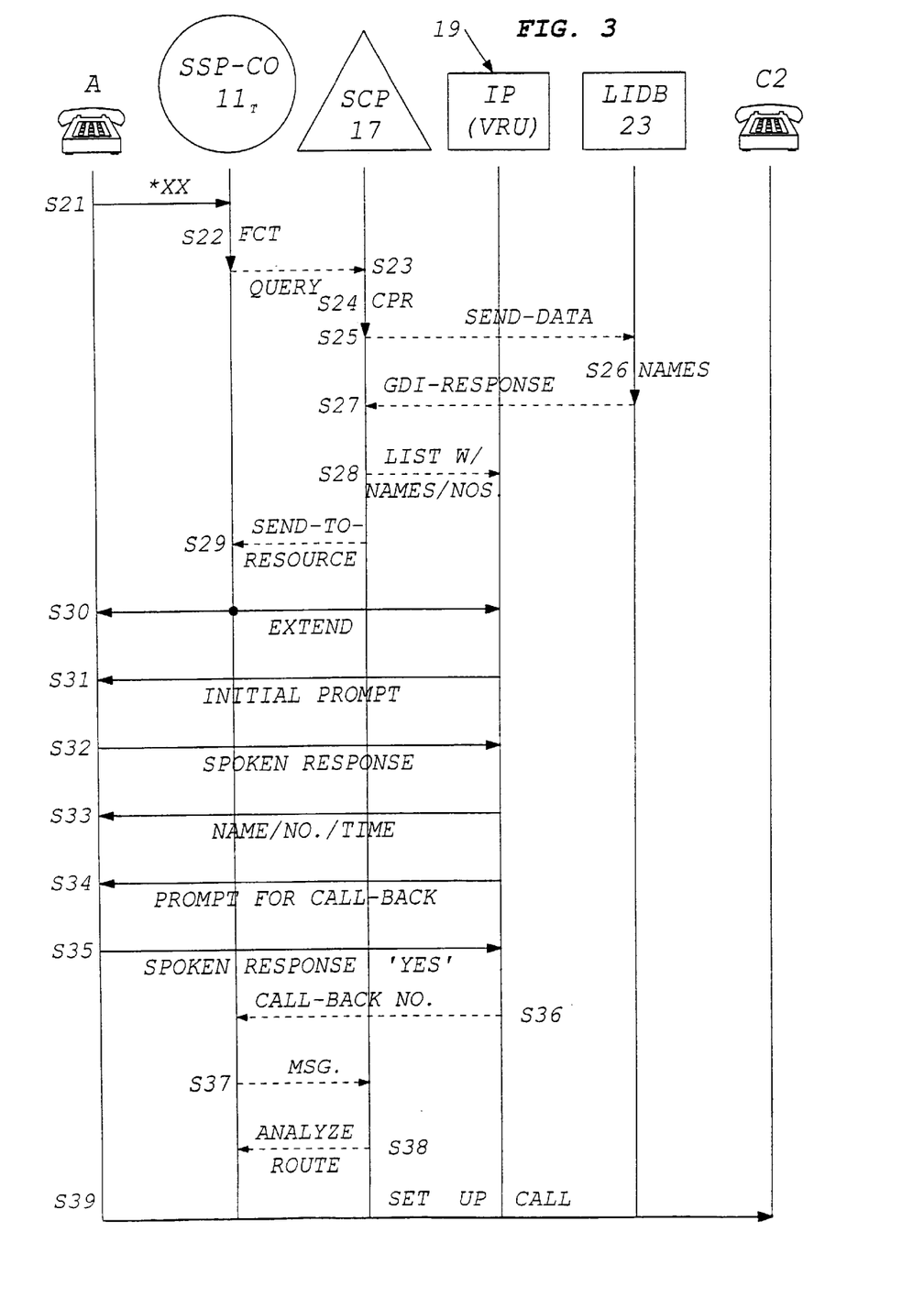
FIG. 3 is a signaling flow diagram illustrating the signaling communication and process flow for a call to obtain notification regarding busy and/or unanswered calls and to initiate a call-back.

At the very least, in step S10 the terminating office $11_T$ provided a call waiting tone to the party using the subscriber's station A. That party knows that a second call came in during the first call, and that call was not answered. The called party at subscriber station A may later initiate a 'Notice' call to obtain the actual notification of whose call triggered the call waiting tone. FIG. 3 depicts the signaling and process flow for that subsequent 'Notice' call.

Here, the processing starts when the customer initiates a call by taking the station A off-hook and dialing a feature code assigned to the call notification service (step S21). Typically, feature codes consist of three dialed characters, such as a *XX code like *58. The serving central office, in this case the terminating office $11_T$, has a feature code trigger (FCT) set against the assigned *XX code.

When the call processing reaches the point in call (PIC) corresponding to the FCT (step S22), the central office $11_T$ suspends its processing of that second call. The switch formulates a TCAP query and sends that query through one or more of the STPs 15 to the SCP 17 (step S23). Again, the initial query includes a variety of information relating to the call, notably the dialed number, the telephone number of the calling party and an identification of the type of triggering event, in this case a FCT. As such, the query identifies that an FCT was detected and includes the specific *XX digits of the particular feature code that this subscriber dialed.

Based on the type of trigger, the SCP 17 determines what information from the query to use as a service key and uses that key to access an appropriate CPR. For the *XX FCT type trigger corresponding to call notification service, the SCP uses the telephone number of the calling party (i.e. the subscriber's station A) as the service key. Using that number, the SCP 17 retrieves a call processing record (CPR) from its internal database and processes the call information using the CPR (step S24). The subscriber's CPR relating the *XX code and thus to the call notification service causes the SCP 17 to transmit a get-data message in the GDI protocol through the OSN network 21 to the LIDB database 23, essentially asking the LIDB to provide name information for each calling party number in the list associated with the subscriber's CPR (step S25).

The LIDB database 23 stores the number and name and other information for network customers served by a particular carrier and/or within a particular geographic service area. If the calling party numbers in the list correspond to subscribers identified in its internal database, the LIDB 23 translates those numbers into name information. Although not shown, the LIDB 23 may communicate with other similar databases operated by other carriers and/or serving subscribers in other areas. Availability of such communications sometimes depends on contractual arrangements with other carriers operating the databases. The LIDB databases may communicate via any available data network, using SS7, TCP/IP, X.25 or other packet protocols. In this manner, if the LIDB 23 does not have a record corresponding to the telephone number of the second caller C2, that LIDB may be able to query another carrier's database and obtain the name information.

Thus, through using its internal data tables or via translations obtained from other LIDB type databases, the LIDB 23 in step S26 provides name information for each caller's telephone number in the subscriber's list (to the extent available). The LIDB sends the name information as a GDI protocol response message back through the OSN network 21 to the SCP 17 (step S27).

The SCP identifies an IP 19, which provides VRU capabilities for the call notification service on calls originated through the particular central office $11_T$. Now using the customer's CPR with the list of numbers and times and the name data from the LIDB 23, the SCP 17 formulates and sends a message containing the name, telephone number and time of each call received during a busy condition (step S28). Here, the SCP 17 formulates the message in accord with the 1129+ protocol and sends the message through the OSN network 21 to the identified IP 19.

The CPR also causes the SCP 17 to generate a TCAP send-to-resource message and send that message back to the central office $11_T$ (step S29). This message provides information for routing the call to the identified IP 19. The SCP 17 sends this TCAP message containing the routing instruction back to the office $11_T$ through one or more of the STPs 15. In response, the central office $11_T$ uses the routing information to extend the call from the subscriber's station A to the IP 19 (step S30). If the IP implements the 1129 protocol communication over the link to the central office $11_T$, this connection is established through a query to the IP from the SSP central office $11_T$, over the 1129 compatible signaling link.

The party at subscriber station A is now in communication with the IP 19. The IP plays one or more announcements to the party and can collect information from the party, as dialing signals or preferably as voice signals, for VRU type processing. The combination of announcements and user selections provides a user interface, which enables the caller at station A to obtain name, number and time for any selected one or more of the calls in the subscriber's list and if desired to select one name/number for call-back.

For example, the IP 19 may play an initial prompt message (step S31), containing a greeting and asking if the subscriber would like the information regarding the most recent call. The subscriber responds with a spoken selection (step S32), such as 'yes' or 'skip'. The IP 19 processes received speech signals and thereby recognizes the spoken selection. The IP plays a subsequent announcement selected in response to the speech from the calling party (step S33). For example, if the party responded with 'yes', the IP executes a text-to-speech conversion routine to provide an announcement of the name, telephone number and time for the most recent call, from party C2 in our example.

If the number of a caller is private, or if the call signaling does not include ANI for the call (e.g. for a call from a telephone booth), the record of the call will not include the name or number of the caller. When the subscriber later obtains notification, the service provides the date and time of the call, but the announcement states that the identification information is 'unavailable'.

After playback of a call notification announcement containing the calling party number, the IP plays another prompt (step S34) asking if the party would like to call the named caller C2. The subscriber responds with a spoken selection (step S35), such as 'yes,' 'no' or 'skip'. The IP 19 processes received speech signals and thereby recognizes the spoken selection. The IP may play a subsequent announcement selected in response to the speech, e.g. another name, number and time announcement; but if the caller responded 'yes,' the voice selection indicates a desire to call the second caller C2. The IP 19 therefore retrieves the telephone number for the caller C2 from its memory and supplies that number to the central office $11_T$ (step S36).

The SSP type central office $11_T$ sends a 'conversational message' through one or more of the STPs 15 to the SCP 17 (step S37). This message includes the telephone number of the calling subscriber's station A as well as the destination number. The SCP 17 returns an 'Analyze Route Response' message to the central office $11_T$ (step S38). This response message causes the switching office to establish a complete call connection from the subscriber station A to the selected prior caller's station, in this case station C2 (step S39) The central office records billing and related information as if the call initiated from the party at station A. Also, the central office supplies identification information for a call from A, e.g. to facilitate caller ID to the party at station C2.

The 'Analyze Route Response' message includes or is accompanied by event instructions. In this case, the event instructions include an 'originating busy event' message, an 'originating answer event' message, and an 'originating no-answer event' with an associated timer function. These event messages cause the central office $11_T$ to process or 'originate' the call to C2, but to report the results in a manner similar to the report provided by the event processing discussed above relative to the incoming call. For example, the central office $11_T$ reports to the SCP 17 if someone answers the call to the station of party C2. If the line to C2 is busy or the call goes unanswered, the central office $11_T$ reports such an outcome to the SCP 17. In either of the later two cases, the SCP instructs the SSP central office $11_T$ to return the call to the IP 19. The IP will offer the subscriber A further options regarding the notification service, e.g. to listen to the next notice message.

The IP announcements allow the subscriber to hear notifications regarding all calls received in the network either while the subscriber's line was busy or which were not answered. The notification service can simply list all calls received regardless of origin. Preferably, the SCP recognizes multiple calls from the same origin source (calling number). The preferred service provides only one message listing the name and number of a party that called more that once but indicating how many calls have been received from that same source. Such an announcement may also provide the dates and times of the various calls from such a source.

The communication between the central office $11_T$ and the SCP 17 in steps S37 and S38 also enables the SCP to control any other services features active against the subscriber's line. For example, if the subscriber at A has another AIN type feature, like "Call Gate", to control outgoing calls, the SCP 17 can apply the appropriate routing logic based on the subscriber's CPR.

With the call notification service, the user can obtain identification information regarding the party whose call triggered any call waiting tone or who called while the subscriber was away. However, the subscriber need not subscribe to caller ID service and need not have purchased a caller ID terminal. The notification service also enables the subscriber to initiate an automatic call-back to the identified caller, again without use of special customer premises equipment.

The called party at the subscriber's premises A can ignore the second call if desired, without even the need to examine a caller ID display. The notification service, however, provides the subscriber comfort in the knowledge that the called party can determine the caller's identity after completion of the existing call and can then choose whether or not to attempt a conversation with the second caller.

Consider now an example where the subscriber at station A also subscribes to a network provided voice mail service, e.g., offered through VMS 25. The network records callers' telephone numbers and call times as discussed above, relative to FIG. 2. In. this case, some terminations (S12) will involve forwarding to the VMS 25, and caller C2 will have the option to leave a message.

Figure 4:
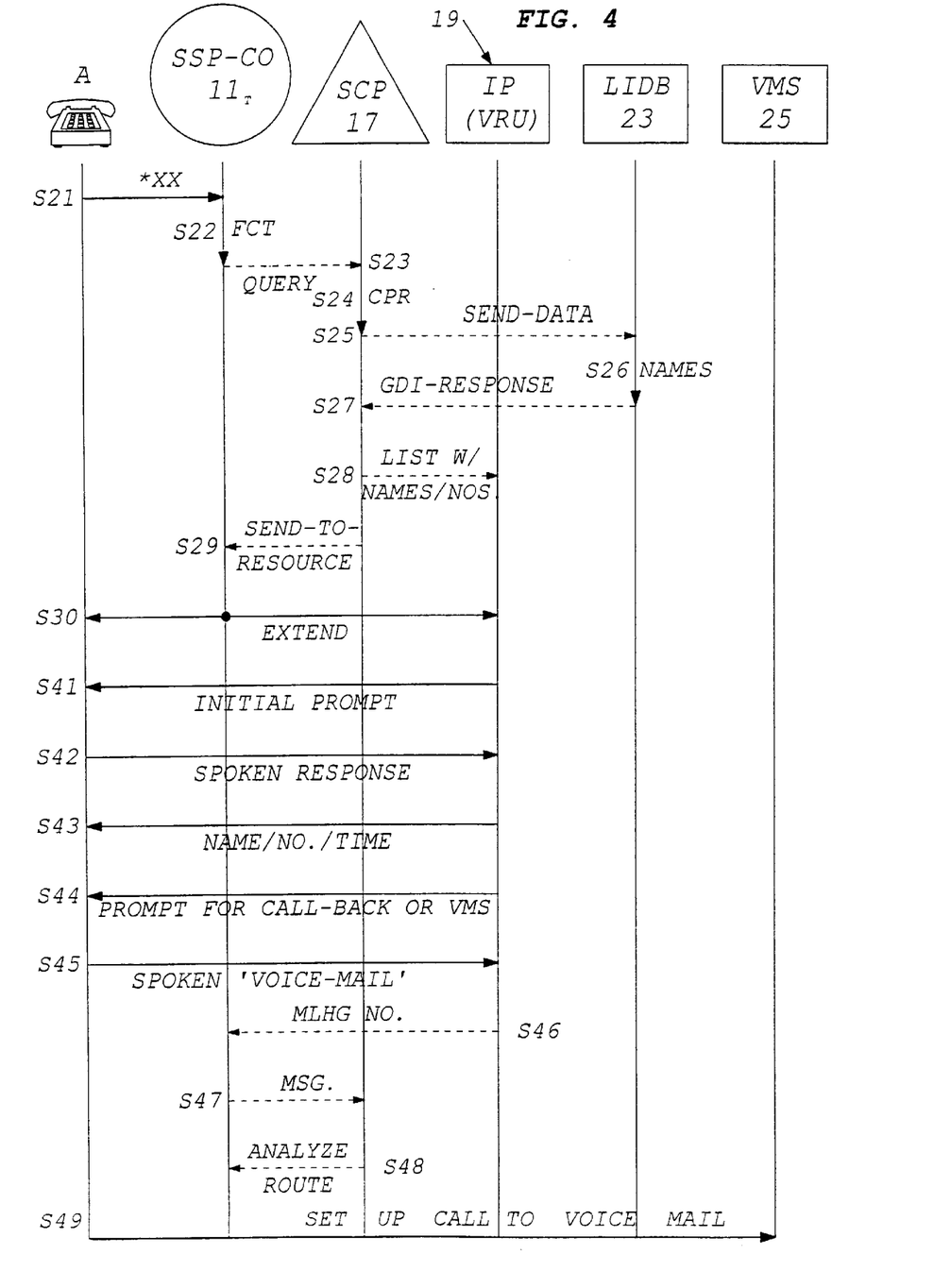
FIG. 4 is a signaling flow diagram illustrating the signaling communication and process flow for a call to obtain notification regarding busy and/or unanswered calls and to initiate voice mail retrieval.

FIG. 4 provides a signal and flow diagram for the 'Notice' call, similar to FIG. 3 but with a modification in view of the subscriber's use of voice mail. The process flow is the same as in FIG. 3 for steps S21–S30 at which point the central office $11_T$ extends the call between the subscriber's station A and the IP 19. At this point, as in the earlier example, the party at subscriber station A is in communication with the IP 19. The IP plays one or more announcements to the party and collects information from the party, as dialing signals or preferably as voice signals, for VRU type processing. In this embodiment, the VRU based user interface provides the option of a call-back to a selected prior caller and the alternate option to initiate a call to the subscriber's voice mail.

For example, the IP 19 again may play an initial prompt message (step S41), containing a greeting and asking if the subscriber would like the information regarding the most recent call. The subscriber responds with a spoken selection (step S42), such as 'yes' or 'skip'. The IP 19 processes received speech signals and thereby recognizes the spoken selection. The IP plays a subsequent announcement selected in response to the speech from the calling party (step S43). For example, if the party responded with 'yes', the IP executes a text-to-speech conversion routine to provide an announcement of the name, telephone number and time for the call from party C2 in our example. The IP will indicate that the identification is 'unavailable', if the caller's number is private or was not received.

After playback of any notification announcement containing the calling party information, the IP 19 plays another prompt (step S44). In this case, the prompt offers the subscriber several options. One option is the call-back, as in the earlier example. Another option is to call the subscriber's voice mail. The subscriber responds with a spoken selection (step S45), such as 'call-back,' 'skip' or 'voice-mail'. The IP 19 processes received speech signals and thereby recognizes the spoken selection. The IP may play a subsequent announcement selected in response to the speech, e.g. another name, number and time announcement; or the IP may initiate the call-back processing portion of FIG. 3. However, if the IP detects that the party responded by saying 'voice-mail,' the IP initiates call processing steps to route the call to the voice mail system (VMS) 25 providing this subscriber's voice mail service.

In the simplest form, the IP 19 has the lead telephone number for a multi-line hunt group (MLHG) to the particular VMS 25. The IP may store this number in a file associated with the subscriber, or the IP 19 may receive this number as part of the information sent with the subscriber's list, from the SCP 17 in step S28. The IP 19 supplies the MLHG number for the VMS 25 to the central office $11_T$ (step S46).

The SSP type central office $11_T$ sends a 'conversational message' through one or more of the STPs 15 to the SCP 17 (step S47). This message includes the telephone number of the calling subscriber's station A as well as the destination number, in this case, the number for the multi-line hunt group to the VMS 25. The SCP 17 returns an 'Analyze Route Response' message to the central office $11_T$ (step S48). This response message causes the central office switching system to establish a complete call connection from the subscriber station A through one of the lines in the multi-line hunt group to the VMS 25 (step S49) and to include identification information for the line to station A in all processing of that call connection. The central office therefore records billing and related information as if the call initiated from A. Also, the central office $11_T$ provides signaling to the VMS 25, as if this was a direct dial call from a subscriber's line. Specifically, the central office $11_T$ supplies identification data corresponding to the station A over the SMDI or D-channel signaling link to the VMS 25. Also, the central office $11_T$ inserts an appropriate type identifier, such as a 'D' in a field of an SMDI message, to identify a direct dialed call to the MLHG number.

The 'Analyze Route Response' message may provide additional signaling to the switch to facilitate the processing of the subscriber's call by the VMS. For example, for a Centrex subscriber, the message may include an AMA slip ID instructing the switch not to bill for the call to voice mail.

To the voice mail system (VMS) 25, the call looks like a direct-dialed call to the MLHG number from the subscriber's line for station A. The signaling identifies a direct-dialed call and provides the caller ID or automatic number identification (ANI) information for the line connected to station A. The VMS 25 will play prompts, collect personal identification information and selection information from the subscriber and play one or more messages, exactly the same as for any subscriber call to the VMS for message retrieval or the like. For example, this operation allows the party at station A to check voice mail for a message from C2, and if the C2 caller left a voice message, the party at A can listen to that message.

The call processing embodiments discussed above recorded caller identifying telephones numbers for all calls to the subscriber's number during times when the subscriber's line was busy. This approach addresses the noted problems with regard to existing call waiting services. However, the call notification service of the present invention also recorded the telephone numbers of additional callers. The service could record the numbers of all callers, but in the preferred embodiment discussed above, the service also records numbers for calls whenever the called party fails to answer the respective call. The notice messages may further include the reason for each call record, i.e. busy or no-answer condition. Such a notification service would still address the problems with call waiting services, but also provides a useful service without association with call waiting.

The above discussed examples of the network and the call processing represent presently preferred embodiments. Persons skilled in telecommunications will realize that the invention admits of a variety of modifications. For example, instead of using separate SCP and/or LIDB databases, the functions of one or more of these databases may be incorporated into an intelligent implementation of a signaling transfer point or 'ISTP' of the type disclosed in commonly assigned U.S. Pat. No. 5,586,177 to Farris and Bartholomew, the disclosure of which is incorporated entirely herein by reference.

Also, there a variety of ways to manipulate the AIN callback feature. For example, the network may perform some analysis and manipulation of the C2 caller's number, e.g. to substitute a company's main number for the actual number of a Centrex line or PBX extension line to the caller's desk. Alternatively, for callers' numbers that correspond to the main number of a large entity having many lines, the IP may provide a voice responsive directory service to enable the subscriber at station A to select which one of the entity's lines to which to direct the call-back. Database information for these substitutions and/or related directory functions may reside at any convenient point in the network, for example in the LIDB or in the IP itself.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A call notification method, comprising:
   detecting a call to a subscriber's number at a communication network office providing service over a link for the subscriber;
   sending a message reporting the call, from the office to a control point via an interoffice signaling network;
   sending a predetermined event instruction from the control point to the office via the interoffice signaling network;
   processing the call to the subscriber's link;
   if a condition of the call during the processing to the subscriber's link corresponds to the predetermined event, sending notice to the control point via the interoffice signaling network;
   recording information relating to the detected call in a control point of the telephone network; and in response to a call from the subscriber link, providing an audible announcement of an identification derived from the recorded information over the subscriber's link.

2. A call notification method as in claim 1, wherein the recorded information comprises a caller's telephone number, and the audible announcement comprises an announcement of the telephone number.

3. A call notification method as in claim 2, wherein the audible announcement further comprises an announcement of a name associated with the caller's telephone number.

4. A call notification method as in claim 1, wherein the predetermined event comprises a busy status of the subscriber's link during the processing to the subscriber's link.

5. A call notification method as in claim 4, wherein the processing to the subscriber's link comprises signaling over the subscriber's link that a call is waiting.

6. A call notification method as in claim 1, wherein the predetermined event comprises failure to answer the detected call within a set period of time when processed to the subscriber's link.

7. A call notification method as in claim 1, wherein:
the communication network comprises a public switched telephone network,
the office comprises one telephone switching office of the public switched telephone network,
the interoffice signaling network comprises a common channel interoffice signaling network, and
the control point comprises a service control point.

8. A call notification method as in claim 7, wherein the step of providing an audible announcement comprises:
establishing a call connection from the subscriber's link through the public switched telephone network to an announcement platform;
providing the identification derived from the recorded information to the announcement platform; and
sending the audible announcement from the announcement platform over the established call connection.

9. A call notification method as in claim 1, further comprising:
receiving a call-back request from the subscriber's link responsive to the audible announcement of the identification; and
in response to the receipt of the call-back request, automatically initiating a call through the communication network from the subscriber's link to a link associated with the recorded information.

10. A call notification method as in claim 9, wherein the step of receiving a call-back request comprises recognizing a spoken request.

11. A call notification method as in claim 1, further comprising:
receiving a request for connection to a messaging system from the subscriber's link after the audible announcement of the identification; and
in response to the receipt of the request, automatically initiating a call through the communication network from the subscriber's link to the messaging system.

12. A call notification method as in claim 11, wherein the step of receiving a request comprises recognizing a spoken request.

13. A call notification method as in claim 11, wherein the messaging system comprises a voice mail system.

14. A method of providing waiting call notification, comprising:
detecting a call to a subscriber's number at an office of a telephone network, the office providing service over a telephone link for the subscriber;
if the subscriber's telephone link is busy, recording information relating to the detected call in a control point of the telephone network;
sending a call waiting signal over the subscriber's telephone link;
in response to a later request from the subscriber's telephone link, establishing a call connection of the subscriber's telephone link to a message platform; and
transmitting a message including an identification derived from the recorded information to a requesting party through the call connection and the subscriber's telephone link.

15. A method as in claim 14, wherein the step of recording information comprises:
sending the information over a signaling link to a service control point of the telephone network; and
recording the information in the service control point.

16. A method as in claim 15, wherein the step of transmitting a message comprises:
deriving the identification from the recorded information and transmitting the derived identification over a data link to the message platform; and
converting the identification to a format presentable to the requesting party and sending the converted identification through the call connection and the subscriber's telephone link.

17. A method as in claim 16, wherein the converted identification comprises an audible announcement of the identification.

18. A method as in claim 14, further comprising:
receiving a call-back request via the subscriber's telephone link and the established call connection; and
in response to the call-back request, initiating a call from the subscriber's telephone link to a telephone link associated with the recorded information.

19. A method as in claim 18, wherein the step of receiving a call-back request comprises recognizing a spoken request from the party received via the established call connection.

20. A method as in claim 14, further comprising:
receiving a voice-mail request via the subscriber's telephone link and the established call connection; and
in response to the voice-mail request, initiating a call from the subscriber's telephone link to a voice messaging system providing voice mail service for the subscriber.

21. A method as in claim 20, wherein the step of receiving a voice-mail request comprises recognizing a spoken request from the party received via the established call connection.

22. An intelligent telecommunication network, comprising:
a plurality of central offices interconnected by trunk circuits, for processing calls originated over a plurality of communication links served through the central offices;
an interoffice signaling network interconnecting the central offices for communication of call related signaling messages;
a service control point, remote from the central offices and connected for signaling communication with the central offices via the interoffice signaling network, said service control point containing a database of call processing records for controlling at least some services provided through the central offices;
a message platform having a communication link connected to one of the central offices, for receiving subscriber inputs and presenting information to a subscriber, the message platform receiving information from the service control point, wherein:

when one central office detects a call to a subscriber's number, the one central office reports the detected call via the interoffice signaling network to the service control point;

the service control point sends a predetermined event instruction to the one central office via the interoffice signaling network;

during subsequent processing of the detected call, if a condition with respect to the subscriber's link corresponds to the predetermined event, the one central office sends notice to the service control point via the interoffice 'signaling network;

in response to the notice, the service control point records information relating to the detected call in association with a call processing record of the subscriber; and in response to a later request from the subscriber's link, the service control point provides the recorded information to the message platform, and the message platform provides a message containing an identification derived from the recorded information over the subscriber's link.

23. An intelligent telecommunication network as in claim 22, wherein the message platform comprises an a voice response unit.

24. An intelligent telecommunication network as in claim 23, wherein the voice response unit comprises an intelligent peripheral, and the intelligent telecommunication network further comprises a data network coupled to the intelligent peripheral and the service control point for transporting the recorded information from the service control point to the intelligent peripheral.

25. An intelligent telecommunication network as in claim 22, further comprising an identification database storing customer records for translating telephone numbers into associated name information, wherein the identification derived from the recorded information comprises a name obtained from the identification database.

26. A general purpose telecommunication network, comprising:

means for detecting a call to a subscriber's number;

means for processing the detected call with respect to a communication link for the subscriber;

means for recording identification information relating to the detected call in a control point of the telephone network, if during the processing of the detected call a predetermined status is detected; and means, responsive to a later request from the subscriber's link, for presenting an identification derived from the recorded information over the subscriber's link.

27. A notification method as in claim 1, wherein the recorded information comprises a date stamp.

28. A notification method as in claim 1, wherein the recorded information comprises a time stamp.

29. A method as in claim 14, wherein the recorded information comprises a caller's telephone number.

30. A method as in claim 29, wherein the recorded information comprises a name associated with the caller's telephone number.

31. A method as in claim 14, wherein the recorded information comprises a date stamp.

32. A method as in claim 14, wherein the recorded information comprises a time stamp.

33. An intelligent communications network as in claim 22, wherein the recorded information comprises a date stamp.

34. An intelligent communications network as in claim 22, wherein the recorded information comprises a time stamp.

35. A notification method as in claim 1, wherein the recording step is in response to the sending notice step.

36. A general purpose telecommunication network as in claim 26, wherein the means for recording identification information is in response to a notice sent via an interoffice signaling network.

* * * * *